Patented June 9, 1953

2,641,617

UNITED STATES PATENT OFFICE 2,641,617

HALOGENATION PRODUCTS OF 1,1-DIPHENYL-2,2-DIMETHYL-PROPANE

Edward F. Rogers, Middletown, and Horace D. Brown, Plainfield, N. J., assignors to Merck & Co., Inc., Rahway, N. J., a corporation of New Jersey No Drawing. Application February 16, 1950, Serial No. 144,593

3 Claims. (Cl. 260—649)

This invention relates to the new chemical compositions, the halogenation products of 1,1-diphenyl-2,2-dimethylpropane, more particularly the reaction products of the chlorination or bromination of 1,1-diphenyl-2,2-dimethyl propane under conditions favoring ring substitution and to the processes for preparing the same. The new chemical compounds with which our invention is concerned, the halogenation products of 1,1-diphenyl-2,2-dimethyl-propane, possess marked and effective insecticidal activity.

Regarded in certain of its broader aspects, the process in accordance with our invention involves reacting 1,1-diphenyl-2,2-dimethyl-propane with chlorine or bromine under conditions favoring ring substitution, to form the corresponding halogenated 1,1-diphenyl-2,2-dimethyl-propane.

In carrying out our novel chemical process, we utilize as starting material 1,1-diphenyl-2,2-dimethyl-propane having the formula:

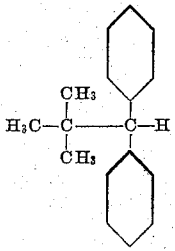

1,1-diphenyl-2,2-dimethyl-propane may be prepared by reacting an alkyl ester of pivalic acid such as ethyl pivalate with phenyl magnesium bromide to form 1,1-diphenyl-2,2-dimethyl-propanol-1 and reacting the latter compound with hydrogen in the presence of a copper chromite catalyst. This process and the product thus obtained are fully disclosed and claimed in our copending application Serial No. 144,592, filed February 16, 1950.

The 1,1-diphenyl-2,2-dimethyl-propane prepared in the above manner is reacted with chlorine or bromine under conditions favoring ring substitution, i. e., in the presence of a catalyst such as iron, at a relatively low temperature, and in the absence of light. The reaction is carried out in a halogenation solvent such as chloroform or carbon tetrachloride. It is ordinarily preferred to limit the halogenation to that corresponding to di-substitution, as the products obtained in this manner have a high order of insecticidal activity and are at the same time low in halogen content. The reaction products thus prepared may be used directly or, if desired, more active fractions may be prepared by purification procedures such as fractional distillation.

Also, new insecticidal compositions are prepared by incorporating in an inert diluent-carrier the reaction products of the chlorination and the bromination of 1,1-diphenyl-2,2-dimethyl-propane under conditions favoring ring substitution. These compounds may be successfully incorporated in a suitable inert solvent or mixture of solvents, or in a solid mixture, with or without other substances, such as wetting, dispersing, and sticking agents. The compounds may be employed in such compositions either as the sole toxic agent or in combination with other insecticides, such as pyrethrum, rotenone, copper salts, etc., or with fungicidal or bactericidal agents, to provide compositions useful for household and agricultural dusts and sprays, textile coating and impregnation, and the like. For example, we have found that these new compounds are highly soluble in various hydrocarbon mixtures, in alcohols, in halogenated hydrocarbons, and the like, and that these compounds may be dissolved in such liquids to provide solutions of enhanced utility. The new compounds may also be placed in aqueous suspension by dispersing organic solvent solutions of the compounds in water. Very useful compositions are obtained by mixing the new compounds with an inert, finely-divided, solid diluent or carrier, such as bentonite, bole, talc, charcoal, pumice, calcium carbonate, and the like. The insecticidal compounds may be admixed in the original form or in solution. In the latter case, the solvent is expelled to leave the inert solid coated and impregnated with the insecticidal compounds. The foregoing compositions possess excellent stability, no reduction in activity being apparent even after long periods of storage, and are very effective in destroying injurious insects of all kinds, such as moths, mosquitoes, flies, beetles, and others.

The preparation of our novel chemical compounds possessing pronounced insecticidal activity may be illustrated by the following specific examples. It should be noted, of course, that these examples are intended to be illustrative of the methods and procedures utilized in preparing these compounds, and that they are not intended to be restrictive or to be regarded as embodying the only way in which our novel compounds can be formed and recovered.

EXAMPLE 1

1,1-diphenyl-2,2-dimethyl-propane was prepared by reacting an alkyl ester of pivalic acid with phenyl magnesium bromide and hydrogenating the 1,1-diphenyl-2,2-dimethyl-propanol-1 as disclosed in our copending application Serial No. 144,592, filed February 16, 1950. 11.2 grams of 1,1-diphenyl-2,2-dimethyl-propane thus prepared was dissolved in 200 ml. of carbon tetrachloride and placed in a 500 ml. flask fitted with a stirrer and condenser. One gram of powdered iron was added and the solution heated to 70° C. Then 18 g. of bromine was introduced below the surface of the liquid over a 3.5 hour period, essentially in the absence of light. Hydrogen bromide evolution was continuous during this time. After addition of the bromine was complete, the material was stirred and heated for an additional 2 hours at 70° C. After standing overnight at room temperature, the product was washed with 2.5 N NaOH and dried over anhydrous $NA_2SO_4$. Evaporation of the solvent resulted in a yield of 17.2 g. of the bromination product of 1,1-diphenyl-2,2-dimethyl-propane in the form of a crude oil. A portion of the oil was distilled to give the following fractions:

(1) Boiling point 150–164° C. at about 1 mm. (0.8 g.)
(2) Boiling point 164–167° C. at <1 mm. (4.0 g.),
(3) Boiling point 183–187° C. at <1 mm. (5.0 g.), Analysis calculated for: $C_{17}H_{18}Br_2$: C, 53.43; H, 4.75; Br, 41.83; found for (2): C, 62.78; H, 6.29, Br, 32.53; found for (3): C, 55.45; H, 5.25; Br, 40.80.

EXAMPLE 2

1,1-diphenyl-2,2-dimethyl-propane (45 g.) was dissolved in 150 cc. of carbon tetrachloride and placed in a flask. One gram of iron powder was added and the solution was treated with chlorine at 0–5° C., essentially in the absence of light. After 3 hours the increase in weight corresponded to a di-substitution. At this point chlorine treatment was stopped, the reaction flask was packed in ice and slowly allowed to warm up to room temperature overnight. The product was washed with dilute sulfuric acid, 5% sodium bicarbonate and dried over anhydrous sodium sulfate. The solvent was removed in vacuo to give 61 g. of the chlorination product of 1,1-diphenyl-2,2-dimethyl-propane in the form of a light yellow-colored oil. Fifty-one grams of this crude oil was distilled at 1 mm. to give the following fractions:

(1) Boiling point 160–167° C. (16.2 g.);
(2) Boiling point 167–169° C. (20.2 g);
(3) Boiling point 174–187° C. (8.6 g.).

Analysis calculated for $C_{17}H_{18}C_{12}$: C, 69.63; H, 6.19; cl, 24.18; found for (1): C, 68.40; H, 5.76; cl, 24.58; found for (2): C, 68.23; H, 5.96; Cl, 27.99; found for (3): C, 63.82; H, 5.55; Cl, 32.28.

EXAMPLE 3

The products prepared as described in Examples 1 and 2 were tested for insecticidal activity as follows:

Clothes moth and carpet beetle tests

The test method employed was that described by R. E. Heal in a paper entitled "Evaluating Protection of Fabrics from Clothes Moth and Carpet Beetle Attack" (J. Econ. Ent., 35 (2), 249–252 (1942)).

Woolen fabric was impregnated with acetone solutions of the products to give known concentrations on the fabric. After evaporation of the solvent, 10 larvae of the webbing clothes moth *Tineola bissellielia* (Hum.) or of the black carpet beetle (*Attagenus piceus* (Oliv.)) were confined on weighed patches of the treated fabric for 2 weeks. After removal of the larvae the patches were again weighed. The loss in weight of the fabric is indicated as "damage" in the table below. Weight loss greater than 10 mgm. is considered to be inadequate protection.

Cockroach and milkweed bug tests

The test method employed followed a procedure of F. C. Nelson et al., as described in a paper entitled, "Evaluating Liquid Insecticides" (Soap, 10, (10), 85 (1934)).

Adults of the German cockroach (*Blattella germanica* (L.)) or of the milkweed bug (*Oncopeltus fasciatus* (Dallas)) were anaesthetized with carbon dioxide, and measured quantities of acetone solution of the test product were deposited on their ventral thoracic surfaces. Observations of mortality were made daily up to the end of 4 days. The results of these tests are indicated in table below:

TABLE

*Insecticidal activity of halogenated diaryl neopentanes*

| Compound | Clothes Moth | | Carpet Beetle | | Cockroach | | | Milkweed Bug | |
|---|---|---|---|---|---|---|---|---|---|
| | Percent Application | Damage, mgm. | Percent Application | Damage, mgm. | Application, mg./kg. | Percent Mortality | | Application, mg./kg. | Percent Mortality |
| | | | | | | Male | Female | | |
| Brominated diphenyl neopentane (crude oil) | 0.5 | 2.7 | 0.5 | 0.2 | 2,000 | 70 | 10 | 2,000 | 60 |
| Brominated diphenyl neopentane (32.5% Br, B. P. 164-7° C., at <1 mm.) | 0.5 | 5.6 | 0.5 | 1 −0.1 | 2,000 | 90 | 20 | 2,000 | 70 |
| Brominated diphenyl neopentane (40.8% Br, B. P. 183-7° C. at <1 mm.) | 0.25 | 3.0 | 0.25 | 0 | 2,000 | 90 | 60 | 2,000 | 80 |
| Chlorinated diphenyl neopentane (crude oil) | 0.5 | 1.0 | 0.5 | −1.6 | 2,000 | 80 | 40 | 500 | 30 |
| Chlorinated diphenyl neopentane (24.6% Cl, B. P. 160-7° C. at 1 mm.) | 0.5 | 4.8 | 0.5 | −1.7 | 2,000 | 70 | 20 | 2,000 | 50 |
| Chlorinated diphenyl neopentane (27.9% Cl, B. P. 167-9° C. at 1 mm.) | 0.5 | 0.7 | 0.5 | −1.6 | 2,000 / 500 | 100 / 70 | 0 / 0 | 2,000 | 90 |
| Chlorinated diphenyl neopentane (32.3% Cl, B. P. 174-87° C. at 1 mm.) | 1.0 | 0 | 1.0 | −1.5 | 2,000 / 500 | 100 / 80 | 60 / 10 | 2,000 / 500 | 100 / 70 |
| Untreated wool | | 80.3 | | 25.4 | | | | | |

Negative values due to unavoidable changes in humidity and larvae residue adhering to wool.

We claim:

1. An insecticidal composition comprising a halogenation product of 1,1-diphenyl-2,2-dimethyl-propane selected from the group consisting of the reaction product of the chlorination of 1,1-diphenyl-2,2-dimethyl-propane under conditions favoring ring substitution wherein the boiling point is between 160° C. and 187° C. at 1 mm. pressure and the chlorine component does not exceed about 32.3% on a weight basis and the reaction product of the bromination of 1,1-diphenyl-2,2-dimethyl-propane under conditions favoring ring substitution wherein the boiling point is between 150° C. and 187° C. at 1 mm. pressure and the bromine component does not exceed 40.8% on a weight basis.

2. An insecticidal composition comprising the reaction product of the chlorination of 1,1-diphenyl-2,2-dimethyl-propane under conditions favoring ring substitution wherein the boiling point is between 160° C. and 187° C. at 1 mm. pressure and the chlorine component does not exceed about 32.3% on a weight basis.

3. An insecticidal composition comprising the reaction product of the bromination of 1,1-diphenyl-2,2-dimethyl-propane under conditions favoring ring substitution wherein the boiling point is between 150° C. and 187° C. at 1 mm. pressure and the bromine component does not exceed 40.8% on a weight basis.

EDWARD F. ROGERS.
HORACE D. BROWN.

References Cited in the file of this patent

UNITED STATES PATENTS

| Number | Name | Date |
|---|---|---|
| 2,455,643 | Bakalar | Dec. 7, 1948 |
| 2,487,854 | Craig et al. | Nov. 15, 1949 |

OTHER REFERENCES

Groggins, "Unit Processes in Organic Syntheses," page 169 (1947).